United States Patent [19]

Aoki et al.

[11] Patent Number: 4,692,804
[45] Date of Patent: Sep. 8, 1987

[54] IMAGE DISTORTION CORRECTING APPARATUS FOR TELEVISION CAMERA COMBINING GLOBAL AND LOCAL CORRECTIONS

[75] Inventors: Akira Aoki, Koganei; Fumio Ukigaya, Higashiyamato, both of Japan

[73] Assignee: Hitachi Denshi Kabushiki Kaisha, Tokyo, Japan

[21] Appl. No.: 831,856

[22] Filed: Feb. 24, 1986

[30] Foreign Application Priority Data

Feb. 22, 1985 [JP] Japan .................................. 60-32722

[51] Int. Cl.⁴ ........................................... H04N 5/228
[52] U.S. Cl. ..................................... 358/163; 358/217
[58] Field of Search ........................ 358/163, 160, 217

[56] References Cited

U.S. PATENT DOCUMENTS 4,473,844  9/1984  Klein .................................. 358/163
4,513,319  4/1985  Breimer et al. ..................... 358/163

Primary Examiner—Gene Z. Rubinson
Assistant Examiner—Stephen Brinich
Attorney, Agent, or Firm—Antonelli, Terry & Wands

[57] ABSTRACT

An image distortion correcting apparatus for a television camera. In addition to an analogue correcting waveform, four corner independent distortion correcting waveforms are employed for rough adjustment together with a digital distortion correcting signal serving for fine adjustment. These waveforms are combined to be utilized for correcting image distortion from which the television camera suffers. A high-accuracy correction of image distortion can be accomplished with a circuit configuration of a small scale.

4 Claims, 5 Drawing Figures

IMAGE DISTORTION CORRECTING APPARATUS FOR TELEVISION CAMERA COMBINING GLOBAL AND LOCAL CORRECTIONS

BACKGROUND OF THE INVENTION

The present invention relates to an image distortion correcting apparatus for a television camera.

In a telvision camera incorporating an image pickup tube or imaging tube, it is known that distortion of high degree takes place in deflection due to nonuniformity among the imaging tube, deflecting coils, deflecting circuits and others. Such distortion has heretofore been compensated for or corrected by using a combination of a correcting waveform of low degree produced by an analogue type correcting circuit and a correcting waveform of high degree produced by a digital type correcting circuit. However, correction of this type involves an increase in the amount of data for correction because all the distortions of high degree are corrected through digital processing. More specifically, in order to realize the correction of distortion with a high accuracy, the number of bits used in a unit of data for correction has to be increased to thereby prevent occurrence of distortion of higher degree and shading due to distortion being partially left uncorrected. To this end, an imaging plane (the scanning area of the target in an image pickup tube) must be divided more finely for the digital correction. As a disadvantageous consequence, a large amount of data for the correction, increasing of the circuit scale and a higher processing speed are required. Of course, these disadvantages can be obviated by decreasing the amount of data for correction. In that case, however, difficulty is encountered in realizing a satisfactory accuracy of correction, to another disadvantage.

SUMMARY OF THE INVENTION

It is therefore an object of the present invention to provide a distortion correcting apparatus for a television camera in which the problems of the prior art distortion correcting system described above are solved in a satisfactory manner.

In view of the above object, it is taught according to an aspect of the present invention that in addition to an analogue correcting waveform of low degree, four corner independent correcting waveforms are made use of for rough adjustment while correcting waveform available from a digital type distortion correcting circuit is employed for fine adjustment, wherein correction of distortion is performed by using the correcting waveforms mentioned above in a synthesized or combined form. According to the invention, high-accuracy correction of image distortion can be accomplished with a circuit configuration of a small scale.

DESCRIPTION OF THE PREFERRED EMBODIMENTS

Figure 2:
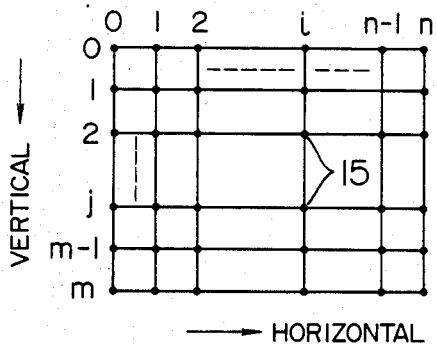
FIG. 2 is a view for illustrating the concept of correction of distortion through hitherto known digital processing.
Figure 5:
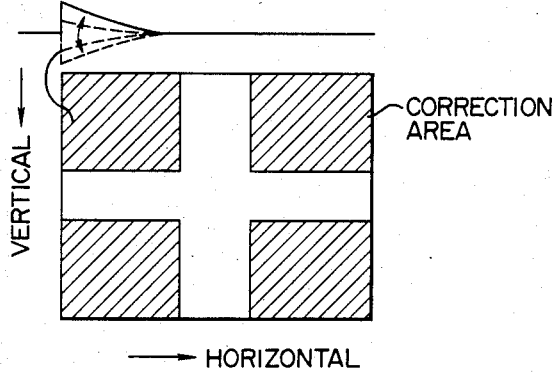
FIG. 5 is a view for illustrating the concept of the hitherto known four corner independent distortion correcting method.
Figure 3:
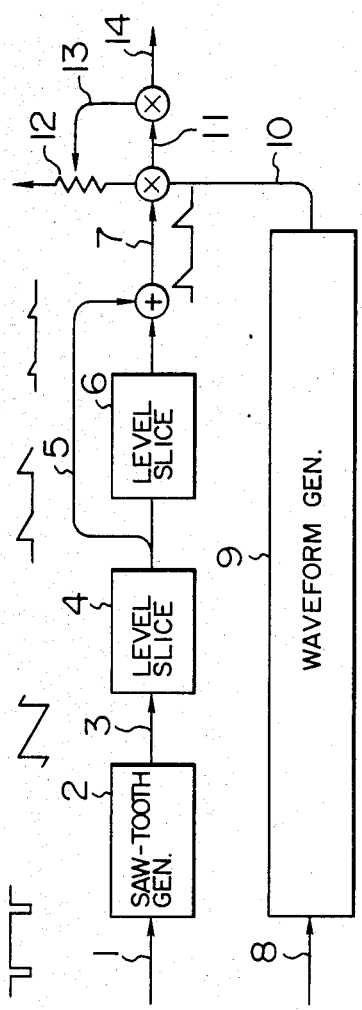
FIG. 3 is a block diagram showing a configuration of one of hitherto known four corner independent correcting waveform generating circuits.
Figure 4:
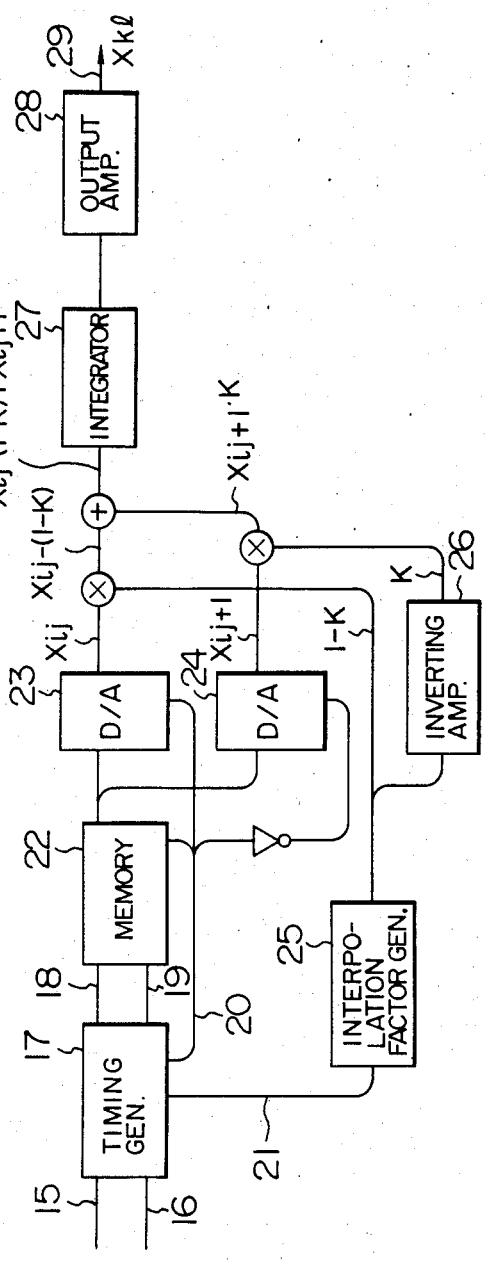
FIG. 4 is a block diagram showing a configuration of a hitherto known digital type correcting waveform generating circuit.

In the following, the invention will be described in more detail by referring to the accompanying drawings. FIG. 5 is a view illustrating schematically the concept of a hitherto known four corner independent image distortion correcting method as well as a range in which the correction is effective. As will be seen, an imaging plane is so divided that four corner regions are defined, in each of which correction of image distortion is performed in horizontal (H) and vertical (V) directions independent of other corner regions. A circuit serving for this purpose is disclosed, for example, in Japanese Patent Publication No. 33757/1983. A configuration of this known circuit is schematically shown in FIG. 3. Although description made hereinafter is directed to a circuit for generating a signal waveform for the correction of horizontal distortion in red-channel in the upper left corner region, it will be appreciated that the same holds true for other channels and direction. Starting from a horizontal synchronizing signal 1, a saw-tooth waveform signal 3 is generated by a saw tooth generator 2 is synchronism with the horizontal synchronizing signal. The saw-tooth waveform signal 3 is sliced at a predetermined level by a level slicer 4 to produce a basic correction waveform 5 corresponding to the left-hand side of the imaging plane. This waveform 5 is again sliced through a level slicer 6 and added to the basic correction waveform 5 to thereby produce a left correction waveform signal 7. On the other hand, an upper correction waveform signal 10 is generated by a similar waveform generator 9 on the basis of a vertical synchronizing signal 8. The left correction waveform 7 and the upper correction waveform 10 thus derived are multiplied with each other to create an upper left corner correction waveform signal 11 which then undergoes multiplication with a level signal 13 established by a red-channel horizontal correction setting circuit 12, resulting in generation of an upper-left red-channel horizontal correction waveform 14. With the similar circuit arrangements, the correction waveform signals corresponding to the upper right, lower left and lower right corner regions are generated and subsequently subjected to similar arithmetic processings. Thus, there can be generated red-channel horizontal correction signals for the four corners, respectively. Next, a hitherto known digital distortion correcting method will be described by referring to FIGS. 2 and 4. In FIG. 2, the imaging plane is divided into n sections in the horizontal direction, while it is vertically divided into m sections, wherein distortion correcting values at intersections 15 between the vertical and horizontal division lines lying at positions given by (i, j) where $0 \leq i \leq n$ and $0 \leq j \leq m$ are stored in a memory. The stored correction values corresponding to the intersections 15, respectively, are sequentially outputted in synchronism with the horizontal and vertical synchronizing signals (i.e. in synchronism with the scanning of a television camera), to thereby arithmetically determine correction values between the intersecting points through interpolation. In this manner, image distortion can be corrected for the whole image. A circuit arrangement for carrying out the digital distortion correcting method mentioned above is schematically shown in FIG. 4. Since operation of this circuit is disclosed in detail in Japanese Unexamined Publication No. 2166/1982, description herein will be limited to a red-channel horizontal correcting waveform generator, being understood that same operation applies to the other channels and direction. Starting from a horizontal synchronizing signal 15 and a vertical synchronizing signal 16, a timing generator circuit 17 produces a horizontal address signal 18, a vertical address signal 19, a D/A converter (digital-to-analogue converter) select signal 20 and a vertical position address signal 21. A memory circuit 22 stores correction values x corresponding, respectively, to the intersections between the vertical and horizontal division lines in the form of digital quantities or data and supplies the correcting value x for a location (i.e. intersection) designated by the timing generator 17 to either the D/A converter 23 or D/A converter 24. Consequently, a correcting value $x_{ij}$ for an intersection at a position (i, j) is produced, for example, by the D/A converter 23, while a correcting value $x_{i, j+1}$ for the intersection at a position (i, i+1) is outputted from the D/A converter 24. A vertical interpolation factor generator 25 produces an interpolation factor of $(1-K)$, while an inverter amplifier 26 produces an inverted factor K. The factors $(1-K)$ and K are then subjected to multiplications with the output signals of the D/A converters 23 and 24, respectively, the resulting products are then added together, as will be seen from FIG. 4. In this manner, correcting values $x_{k1}$ for positions located between the intersections (i, j) and (i, j+1) can be arithmetically determined through interpolation. The correcting values thus derived are integrated by an integrator circuit 27 to be converted to a smoothly varying horizontal distortion correcting signal which is then supplied to an output amplifier 28. In this manner, a red-channel horizontal distortion correcting waveform signal 29 can be derived from the output of the amplifier 28. The above is an outline of the digital correcting method.

Figure 1:
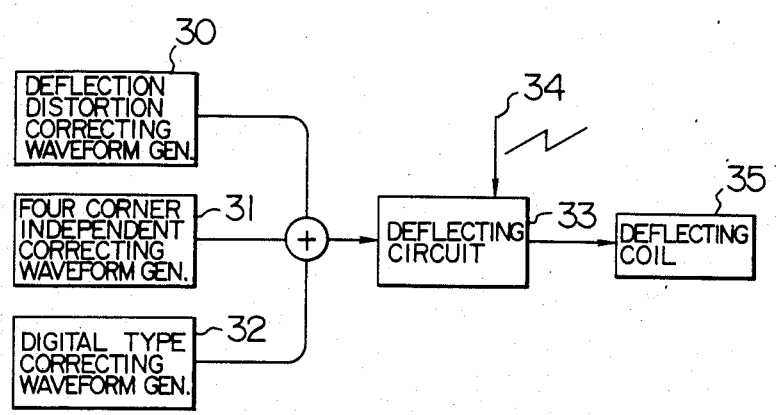
FIG. 1 is a block diagram showing a general arrangement of a distortion correcting apparatus according to an exemplary embodiment of the present invention.

Next, fundamental operation of an image distortion correcting apparatus according to the present invention will be described by referring to FIG. 1 on the assumption that it is applied to the correction of red-channel horizontal distortion, being understood that same applies valid to other channels and direction. A low-degree deflection distortion correcting waveform generator circuit 30 generates a low-degree correcting waveform made from a saw-tooth wave and a parabolic wave. The distortion produced at a central portion of the image is mainly corrected by such correcting waveform. A four corner independent correcting waveform generator circuit 31 generates a correcting waveform for correcting the distortion occurring at four corners of the image. A large part of the deflection distortion can be eliminated by using the above-mentioned two correcting waveforms, however high-degree deflection distortions are retained in the image as a whole, although the amount of each of the distortions may be small. To eliminate such retained high-degree deflection distortion, a digital type correcting waveform generator circuit 32 generates a high-degree deflection correcting waveform to be added with other waveforms from the circuits 30 and 31. The resulting sum signal is supplied to the input of a horizontal deflecting circuit 33 for the red channel as a correcting waveform which is then superposed on a horizontal saw-tooth waveform 34 and converted into a current to be subsequently supplied to a deflecting coil 35 to compensate for distortion involved in the deflection.

According to the teaching to the invention, it has been found surprisingly that the display distortion can be suppressed to less than 0.6% by virtue of the combination of the four corner independent correcting waveforms with the low-degree deflecting distortion correcting waveform. Consequently, the correcting waveform produced by the digital circuit system is protected from any significant variation, while occurrence of the shading can be suppressed to a minimum. Furthermore, since six-bit length is sufficient for each of the correcting data employed in the digital circuit system for the correction ratio of 0.0125%/bit, the storage capacity of the digital type correction waveform generating circuit 32 can be reduced significantly, which in turn means that the circuit as a whole can be implemented on a small scale.

As will be appreciated from the foregoing description, the image distortion correcting circuit according to the invention can ensure correction of image distortion with an enhanced accuracy with the circuit scale being retained at a minimum.

We claim:

1. An image distortion correcting apparatus for a television camera incorporating a plurality of imaging elements, comprising:
   at least, a distortion correcting waveform generating circuit of analogue type in which an imaging plane of said television camera is divided into four corner areas for correcting image distortions at said corner areas, respectively, independent of one another;
   a distortion correcting waveform generating circuit of digital type in which said imaging plane is divided into horizontal and vertical directions by given numbers of dividing lines, respectively, said digital-type correcting waveform generating circuit storing correcting values for every intersection defined by said dividing lines in the form of digital quantities for generating correcting waveforms on the basis of said digital quantities;
   an adder circuit for adding the distortion correcting waveforms produced by both of said distortion correcting waveform generating circuits; and
   a deflecting circuit supplied with the output from said adder circuit.

2. An image distortion correcting apparatus according to claim 1, wherein said digital type distortion correcting waveform generating circuit includes a timing generating circuit, a storage circuit, an interpolation factor generating circuit, a digital-to-analogue converter, an inverting amplifier and an integrating circuit.

3. An image distortion correcting appratus
   according to claim 1, wherein said analogue type distortion correcting waveform generating circuit includes a saw-tooth waveform generating circuit, a level slicer, an adder and a waveform generating circuit.

4. An image distortion correcting apparatus for a television camera incorporating a plurality of imaging elements, comprising:
   a first circuit for generating an analogue type, low-order deflection distortion correcting waveform;
   a second circuit for generating a four-corner distortion correcting waveform for independently correcting the distortion located at the four corners of an imaging plane;

a third circuit for generating a digital type, high-order distortion correcting waveform, said third circuit including means for storing correcting values in digital form for each portion of said imaging plane which is divided into a plurality of portions by a plurality of intersecting horizontal and vertical lines;

a first distortion correcting signal being generated by said first and second circuits for providing rough correction of large amounts of distortion to a low-order degree; and a second distortion correcting signal being generated by said third circuit based on said stored digital values for providing further correction of said distortion to a high-order degree;

said first and second distortion correcting signals being added by means of an adder circuit with the resultant sum being applied to a deflection circuit as a deflection distortion correcting signal.

* * * * *